Aug. 30, 1932. F. G. HEHR 1,874,994
COMBUSTION CHAMBER FOR DIESEL ENGINES
Filed Aug. 3, 1929

INVENTOR
Frederick G. Hehr
BY
Townsend & Decker
ATTORNEYS

Patented Aug. 30, 1932

1,874,994

UNITED STATES PATENT OFFICE

FREDERICK G. HEHR, OF NEW YORK, N. Y., ASSIGNOR TO AEROL ENGINE CORPORATION, OF NEW YORK, N. Y., A CORPORATION OF NEW YORK

COMBUSTION CHAMBER FOR DIESEL ENGINES

Application filed August 3, 1929. Serial No. 383,229.

This invention relates to improvements in oil burning engines of the internal combustion type.

It is one of the primary objects of the invention to provide a combustion chamber having a separate permanent interlining of a substantially non-combustible material having a relatively low factor of heat conductivity which lining will normally receive all of the heat formed in the combustion chamber and which will be subjected to and withstand the effects of the stream of ignited materials flowing toward the combustion chamber.

It is a further object to provide a construction of this character wherein the main combustion head is provided with a separate cooling means without said lining which will serve to maintain the combustion head at a satisfactory operating temperature under all conditions.

The above and other objects will appear more fully from the following description when considered in connection with the drawing, in which.

In oil burning engines of the Diesel type there have been encountered many difficulties due to the extreme heat developed in the combustion chamber and the tendency of the heated gases, mainly during their discharge from the combustion chamber to eat away and destroy the walls of the combustion chamber adjacent the discharge outlet leading to the power cylinder. Another difficulty has arisen through cracking and carbonization of the injected fuel owing to superheated spots, leading to a filling up of the combustion space with the carbon generated. A further difficulty has resulted through overcooling of the combustion chamber, leading to incomplete combustion and smoky combustion. According to the present invention these difficulties are overcome as will appear more fully below.

Figure 1:
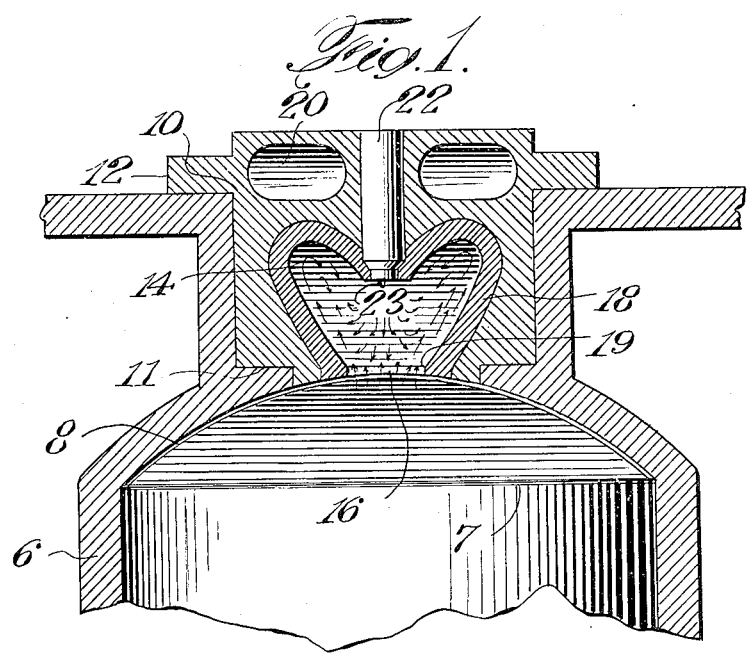
Fig. 1 is a longitudinal sectional view taken through the outer end of a cylinder and cylinder head showing one form which my invention may assume.

In Fig. 1 I have shown a power cylinder 6 provided with a power piston 7 formed with a rounded head, the piston reciprocating in the cylinder 6 during the operation of the engine. The compression and expansion chamber 8 as shown in Fig. 1 is substantially closed at the end of the compression stroke of the motor to force the entire charge of fuel and air into the combustion chamber referred to below.

Fuel is supplied to the combustion chamber 14 through the cooled combustion chamber head 10 formed of metal having relatively high heat conducting properties, for example, copper or its alloys, aluminum alloy or beryllium alloy, ensuring a substantially even temperature throughout all sections of the combustion chamber and to avoid preheating the incoming fuel to an undesirable degree. The head 10 may be formed with a shouldered portion 11 and a flanged portion 12 received on corresponding portions of the cylinder and securely held in place as by means of machine bolts or other fastening devices (not shown).

The combustion chamber 14 formed within the lower portion of the head 10 is of general heart shape and is provided with an opening 16 leading to the compression and expansion chamber 8. The combustion chamber is proportioned to receive substantially the entire charge of fuel and air when the charge is fully compressed and in this respect is to be distinguished from the preignition chambers of other engines wherein a portion only of the air is received within the chamber. The opening 16 is preferably restricted with respect to the internal diameter of the chamber 14 so that the igniting and expanding gases will flow in a steady stream from the combustion chamber 14 into the chamber 8 and to cause the air and fuel to be thoroughly agitated and mixed during the injection period. It will be understood that the particular shape of this chamber may be changed within certain limits without departing from my invention.

The chamber 14 is provided with a lining 18 formed of substantially non-combustible material having relatively poor heat conductivity, for example, cast iron alloyed with chrome, nickel or aluminum. This lining entirely encloses the combustion chamber and receives directly the heat formed therein. The lining 18, adjacent the opening 16, is formed with a projecting flange 19 constituting the wall of the opening 16 so that the stream of ignited gases issuing from the combustion chamber will engage only the lining 18 and not the material of which the head 10 is formed.

The head 10 and lining may be formed by first molding the lining 18 and thereafter casting the main body of the head 10 around the lining 18 using this lining as a core. This method permanently secures the lining against removal within the head, and assures the proper shape and proportions for the interior of the chamber 14 and the intimate contact between the lining 18 and head 10, the particles of the material forming said head and lining being actually attached throughout their contacting surfaces, thus avoiding any failure of conducting heat uniformly from all portions of the heated surface of the combustion chamber.

The head 10 is formed with any suitable cooling devices, for example the same may be formed with the water passage 20 (Fig. 1) encircling the head 10 and connected with a water supply reservoir. By providing the cooling means 20 directly on the head 10 and as a part of the material having relatively high heat conducting capacity the desired temperature may be maintained in the combustion chamber 14 irrespective of temperature of the walls of the cylinder 6 which are cooled independently by the usual cooling devices.

Fuel is introduced into the combustion chamber 18 through the inlet passage 22 connected with a power injector and a fuel reservoir of the usual type.

Figure 2:
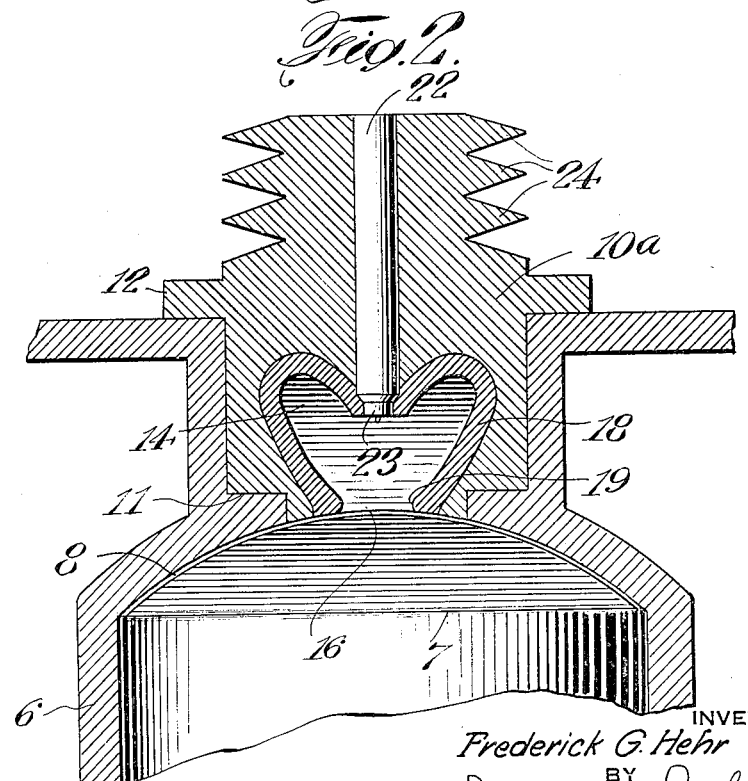
Fig. 2 is a similar view showing a slightly modified form of the construction.

In Fig. 2 the cylinder 6, piston 7, lower portion of the head 10a, combustion chamber 14, etc. are the same as in the first form of the invention. The head 10a, however, is formed with a series of air cooled fins 24 in place of the water passages as in the first form shown. Since the body of the head 10a is formed of a material having relatively high heat conducting capacity the fins 24 are sufficient to maintain the same at a satisfactory operating temperature this construction likewise withdrawing the heat directly from the head 10 and maintaining a temperature for the head 10 and chamber 14 substantially independently of the temperature of the cylinder 6.

In the use of the apparatus the lining 18 becomes highly heated through heat collected from the burning gases but due to its formation of non-combustible, non-scaling material and its relatively poor conductivity the lining retains a high heat but is not injured or destroyed. The head 10 is maintained at normal operating temperature by means of the cooling effect of the water passageway 20 or fins 24. The combustion chamber lining 18 is slow to give off its heat hence the interior of the chamber walls 18 are normally highly heated, the degree of heat attained therein being limited and maintained substantially uniform for all parts of the combustion chamber by the cooling effect of the surrounding head 10 in intimate contact with the lining 18 throughout the entire extent of the latter. Since the lining 18 extends entirely over the surface of the chamber 14 even to the point of discharge 16 into the chamber 8 the gases do not tend to eat away nor otherwise destroy the walls or general shape of the chamber 14.

Having now described my invention, I claim:

1. In an oil engine, a power cylinder, a separate combustion head therefor formed with a combustion chamber having a discharge outlet, and an inner lining for said combustion chamber and outlet formed mainly of cast iron, said head being formed of a metal having relatively higher heat conductivity than said lining, said inner lining being in intimate contact with the metal forming said head and permanently formed therein.

2. In an internal combustion engine, a power cylinder, a combustion head formed with a combustion chamber communicating with said cylinder and a permanent inner lining entirely enclosed within the material forming said head and formed of a material having relatively low heat conductivity, said lining covering the entire surface of said combustion chamber up to the point of communication thereof with said cylinder, and means individual to said head for cooling the same.

3. In an oil engine, a combustion head formed with a combustion chamber therein, an inner lining permanently formed in said combustion chamber formed of a metal different from the material of said head and in intimate contact with the material thereof throughout the extent of said lining, said inner lining including a reduced ejection nozzle forming a discharge opening from said combustion chamber, said opening being positioned adjacent the innermost portion of said head with respect to the interior of said cylinder.

4. In an oil burning apparatus, a combustion head formed with a combustion chamber having a discharge outlet, an inner lining permanently formed in said combustion chamber formed of a substantially non-combustible metal covering the entire inner surface of said chamber and said discharge outlet and in intimate contact with said head throughout the entire extent of said lining and means for spraying fuel into said combustion chamber.

5. In an oil engine, a power cylinder, a removable combustion head for said cylinder and formed with a combustion chamber having a discharge outlet, said head being formed of a metal having relatively high heat conductivity, an inner lining permanently formed in said combustion chamber and outlet formed of a metal having relatively low heat conductivity, said lining being in intimate contact with the metal forming said head throughout substantially the entire extent of said lining, means for independently controlling the temperature of said head and lining and means for spraying oil into said combustion chamber.

6. In an internal combustion engine of the fuel injection type provided with a power cylinder and piston, a combustion head formed of a material having relatively high heat conducting capacity and having the material thereof mainly separated from the interior of said cylinder, said head including a centrally arranged combustion chamber communicating with the interior of said cylinder, a lining permanently formed in said chamber having relatively poorer heat conducting capacity than the material of said head and lining the entire inner surface of said chamber to and including the point of communication thereof with said cylinder, said lining being in intimate contact with the material forming said head throughout said chamber.

7. In an engine, a cylinder, a combustion head formed with a combustion chamber communicating with the interior of the cylinder, the walls of said head surrounding the combustion chamber being composed of a considerable body of metal of high heat conductivity, the major portion of the head being separated from the interior of the cylinder, and a permanent lining for said combustion chamber formed of a metal of relatively poorer heat conductivity than the material of the head, the lining being located entirely externally of the cylinder interior and being in intimate contact throughout with the walls of the combustion chamber of the head.

Signed at New York, in the county of New York, and State of New York, this 1st day of August, A. D. 1929.

FREDERICK G. HEHR.